3,725,171
PROCESS FOR THE MANUFACTURE OF SYNTHETIC LEATHER MATERIAL
Claude El-Baz Nouchy, 25 Rue Vital, Paris, France
No Drawing. Filed July 7, 1970, Ser. No. 53,019
Int. Cl. B44c 5/00
U.S. Cl. 156—230    13 Claims

ABSTRACT OF THE DISCLOSURE

This invention relates to a process for the manufacture of synthetic leather particularly for boots vamp, comprising:
(a) impregnating a polyurethane elastomer foam having macroporous structure and communicating pores with a polyurethane elastomer dissolved in a solvent of the elastomer but non solvent of the foam;
(b) eliminating solvent by evaporation;
(c) compressing the impregnated foam cleared of solvent in order to obtain a microporous structure with communicating pores.

---

For many generations, people have tried to substitute a product for leather in view of scarcity of supply of this raw material, its consequences on the prices, without mentioning the complete lack in case of international conflict.

Numerous substitutes have already been found to take place of leather with more or less success, and for a limited number of applications in one particular field of activity. However for application to vamps for boots, there is practically no satisfactory synthetic product.

The following list of already existing products will not be exhaustive, but permits to determine the advantages and the drawbacks of certain products and their utilization in attempt to better locate the new invention and to appreciate its merits.

(1) "Synderme" is a crushed leather, reconstituted by a latex binder; "SALPA" is similar to Synderme with an improved surface; the defect of this product is its poor strength, it is too stiff: compared with leather of equal thickness, for example 4 to 5/10 mm.; Synderme is very cheap and its application in bootmaking, which is large, ranks first as regards assembly and cleanliness.

(2) "Texon" is an another product made of alfa fibres (cellulose) agglomerated and impregnated with an elastomer used as binder; Texon has the same defect and practically the same applications as "SALPA."

(3) "SKAI" is a bed of foam of expanded polyvinyl chloride (PVC); this product has the properties of "rolling" and flexibility of leather, however its resistance to bending and to tearing is very low; it cannot be distributed without a good backing of cotton; in view of the fine surfaces obtained, it can be compared to leather; Skai has found an outlet in the trade of low price hand and travelling bags.

(4) For the last ten years, PVC coated on more or less resistant cloth was extensively used to make vamps for very cheap boots and soldier boots assembled by thermo-welding.

Coated PVC is very heavy, air tight, without flexibility and does not resist to acidity produced by perspiration; it crackles and becomes very hard.

(5) Impregnated non woven materials have a granular surface, very poor "rolling," low or irregular mechanical resistance and practically no remanence. A number of methods were suggested to obviate more or less these backgrounds.

One of these methods consists in coagulating a non-woven product previously impregnated with a polymer dissolved in a solvent, non-solvent of the non-woven product, this being obtained in a ratio in weight varying between 80/20 and 97/3, for example, in hot water.

This coagulation creates through the non-woven product, a cellular product with microporous structure, since the solvent contained in the polymer eliminates and volatilizes when immersed in hot water, the temperature of which is selected in relation to the temperature of volatilization of the solvent.

Another method suggests a similar process permitting to obtain by coagulation a microporous structure on a non-woven product.

These two processes, in order to obtain microporosity, require times of immersion in water as long as 60 minutes. For a continuous operation, this operating method is irrational and requires the use of a very heavy equipment.

The cost price is very high and the results very irregular, since the baths cannot be used beyond a given saturation.

On the other hand, in the manufacture of non-woven products, more or less short fibres are previously agglomerated or bounded by webbing and looming, that is to say at random; it thus appears doubtful, if not impossible, to obtain a perfect regularity, more particularly as regards breaking strength and tearing as well as mechanical properties of the final texture. This is the case, in fact, of most of the non-woven products presently available.

Finally, the rate of compression of fibers is very diverse and, therefore, the mechanical and physical properties vary necessarily from one operation to the other, according to the applied power of compression.

This absence of mechanical and physical regularity of the texture thus obtained, justifies the insertion of woven backing placed between the coat of the coagulated non-woven product and the polished or granulated surface.

It appears that this technique has not much improved the old processes in the view point of appearance, since the product in the absence of the above mentioned woven backing when it is stretched, has a gritty surface, this defect is particularly detrimental on industrial products.

Although valuable improvements were made in the manufacture of non-woven products, it seems that the objective initially aimed at was not reached and consequently the product obtained for making vamps has no flexibility: this constitutes the main objection made by bootmakers and still more by users since the foot remains permanently compressed in the boot.

Among the techniques above described, one point has retained the attention of the inventor, as being essential: i.e. the final result consists in obtaining a microporous product with communicating micropores.

The process described in the present invention, consists in using as a starting material a macroporous structure with communicating cells and to apply thereto a proper treatment in order to make this structure microporous.

As macroporous structure, one may use elastomer polyurethane foam and preferably the foam called "cured" which has the largest cells and a wide range of pore numbers up to 100 pores per linear inch (25.4 mm.).

This foam has between the pores, elastomer partitions of very fine texture (about two deniers"). This characteristic permits us to avoid the use of nonwoven products made from discontinued fibers of various length and bound by webbing and looming.

The use of polyurethane elastomer fibres currently used to make elastic fabrics of the "Helanca" type cannot be envisaged in an industrial manufacture of non-woven products in view of the high price of this material as compared to the price of cotton fibres or nylon fibres.

The fact of using polymethane foam, according to the invention, permits to obtain a texture of non-woven products (this texture being continuous and regular) made of polyurethane elastomer fibres, since the foam can be previously cut to the desired regular thickness before treatment.

Polyurethane fibre is a "extraordinary" fibre: it has characteristics by far superior to any other fibre as regards resistance to abrasion, remanence, elasticity, resistance to tearing, resistance to chemicals, to moisture and to mildew and above all mechanical resistance (which is very high); these combined characteristics contribute to make a product of excellent quality for the manufacture of vamps.

According to the invention, polyurethane foam is impregnated with polyurethane elastomer dissolved in a solvent of elastomer but non solvent of the foam by any usual process, namely:

Full bath and centrifugal drying, fulling, "reverse-roll," air blade, Champion, coating system, sticking press, combined locks, Kimberley-Clark-Mead coating system, Massey coating system, Offset engraving, Helio engraving, steel blade, trailing blade coater, direct coating with doctor blade etc.

The purpose is to allow the foam to absorb a very precise and regular quantity of elastomer.

If the selected polyurethane is linear, with one component, the impregnated foam becomes thermoplastic, this characteristic being useful for the manufacture of boots and with non negligible commercial advantage since the new product can be thermowelded.

Preferably, the polyurethane elastomer is selected in order to have:

breaking strength of about 500 kg./cm.$^2$
an elongation of about 600%
a modulus of elongation at 100% of about 25 kg./cm.$^2$
a modulus of elongation at 300% of about 68 kg./cm.$^2$
a resistance to crumbling temperature equal to at least 60° C.

It will thus be possible to use this new product for vamp in very cold countries.

The above standards leave a very large margin for safety; current experience made with textile backings coated with PVC, has shown that with a resistance to breaking of 100 kg./cm.$^2$, the margin of safety was quite sufficient.

The required flexible elastomer polyurethane foam is obtained starting from polyols and isocyanates of a density around 10 to 50 kg./m.$^3$ and preferably 30 kg./m.$^3$, of current quality or of a quality called "cured" with wide open cells, the number of which is comprised between 30 and 100 pores per linear inch (25.4 mm.); it can be of the polyester or polyether type; however any other quality of foam can be used.

The elastomer used for impregnation may be polyurethane with one component thermoplastic linear and, in this case, the synthetic leather can be thermowelded or of the type with two components (polyester or polyether with long chain still soluble, becoming cured by reaction with polyisocyanate, which make the product insoluble and still curable by polyisocyanate).

Polyurethane elastomer with two components is obtained by reaction of diisocyanate ether with a diol, which may contain a small quantity of triol and having terminal OH groups, or with a polyether.

In varying the composition or the molecular weight of polyester or polyether, one may adjust flexibility and the plasticity of the polyurethane film.

The polyisocyanate reacts as polyfunctional isocyanate with the reactive groups of polyesters or polyethers, the terminal OH groups, to form a tridimensional molecular structure.

The new chemical structure offers very wide technical possibilities, namely: elasticity, flexibility, very high breaking strength and resistance to abrasion as well as to chemicals and, above all, to mildew and moisture.

The polyurethane elastomer used for impregnation is dissolved in a solvent such as methylethylketon or ethyl acetate wih a concentration of 25% to 30% of dry extract.

According to the invention, the foam after impregnation is then dryed in a furnace to eliminate solvents. A kind of chemical welding is obtained between elastomer and foam so that the final texture reaches an exceptionally high mechanical resistance, while keeping flexibility, roundness, elasticity, remanence; these characteristics belong to the proper nature of elastomer polymethanes.

The new product can have a resistance to flexion superior to 250.000, which is quite sufficient for a vamp.

After drying the impregnated texture is compressed and thus acquires its best characteristics of mechanical resistance.

In fact, when a polyurethane elastomer dissolved in a solvent was dryed in a furnace, the remaining elastomer remains very sticky as long as it is not cured (in the case of elastomer with two components) or as long as the solvent is not entirely evaporated (in the case of elastomer with one component).

After evaporation of the solvents, it is thus necessary to compress the impregnated texture, by means, for example, of a calender or pressing rolls able to reach one metric ton per cm.$^2$ and preferably limited to 300 kg./cm.$^2$, until the maximum allowable compression is reached.

In addition to new characteristics of excellent mechanical strength, the thickness of the new product is absolutely regular; also the surface will be smoother according to the number of cells contained in the foam as selected before impregnation.

The new product remains smooth even placed under tension; this constitutes its main advantage and in this regard is far superior to other available products.

Another advantage consists in a practically uniform thickness of the final texture for a constant compression power and a uniform thickness of the foam before treatment.

The weight of the elastomer solution used for impregnation should be permanently in proportion with the thickness of the foam.

The best results are obtained in using a solution containing about 25% to 30% of elastomer in ethyl acetate or in methylethylketon; a ratio between the weight of foam and the weight of impregnant equal to 5/100 or 95/100 but preferably 50/100 gave excellent results. It goes without saying that one may select other ratios, which will give as good results.

On the other hand, in order to increase the microporosity and to incite the marketing and selling of the product, improvements are being developed concerning the "breath" and absorption of moisture to be comparable with those of leather, by way of a water hydrolysis.

The problem consists to take advantage of an affinity to hydrolysis of certain polyurethane elastomers.

This is the main difference of the present invention over former processes and techniques according to the latter, elastomer is coagulated in water when it is still in solution in order to secure microporosity by means of bubbles obtained by volatilization of the solvent in hot water.

On the contrary, according to the present invention, the already existing microporosity is enlarged by hydrolysing elastomer when it is no longer in solution and already under its final solid form. The result of this operation is to split certain chemical compounds; this treatment gives birth—and this was unexpected—to microscopic porosities permitting the new texture to "breathe."

Hydrolysis has the advantage to give a "spongy" character to the new product; this is useful for the absorption of moisture since it has a storing capacity of moisture quite sufficient to absorb perspiration produced in one day by a foot and the possibility to throw it back when the product is no longer in contact with the source of moisture.

The new product is far better and specially more regular than any other synthetic product and can be compared to the best leathers for boot vamps.

The hydrolysis can be performed by way of a simple dipping in water, preferably around 70° C. and dried in any thermic textile dryer. This is a continuous process; it is very rapid and homogeneous; here again, the cost price of the operation is very low and the result more regular than other conventional processes.

According to another characteristic of the invention, a film of polyurethane is coated on one of the faces of the product, preferably by means of transfer on paper or other stripping agent in order to give the product after treatment a "pleated" effect comparable to the surface of leathers.

In order to increase resistance on sewing points, it is possible to place a thin lining made of nylon or polyester, which does not reduce the flexibility and extensibility in all directions of the new product, but gives full safety when sewing.

According to an alternative of the invention, one may use finely crushed polyurethane, which is mixed with the elastomer in solution in an average ratio of 50/50 in weight, for example.

The mixture thus obtained is calendered on a transfer backing, then dried and rolled; it may be lined with cloth, "jersey" or non-woven product or other backings. This product has very good characteristics as regards microporosity; it may be hydrolysed if necessary, however, as compared with the product above described, its mechanical characteristics are lower.

The invention may be illustrated with the following non exhaustive examples:

EXAMPLE I

The elastomer polyurethane foam is of the current type of density used, namely 30 kg. per m.$^3$ containing 100 pores per linear inch (25.4 mm.).

The impregnation composition contains the following substances:

| | Parts |
|---|---|
| Imparil CHW [1] (polyester with elongated chain still soluble) | 100 |
| Imprafix TH [1] (polyfunctional isocyanate) | 10 |
| Imprafix BE [1] (interlacing accelerator) | 10 |
| Methylethylketon | 20 |
| | 140 |

[1] Of the firm Farbenfabriken Bayer A.G.

The thickness of the impregnation coat corresponds to a theoretic coefficient arbitrarily selected and equal to 0.25 mm. in thickness of the impregnation coat for 1 mm. of foam thickness.

The average density of the composition being of about 1, this means that the rate of impregnation is equal to 250 g. of composition per m.$^2$ and per one mm. of foam thickness.

For this experiment, the foam has 8 mm. in thickness; 2 kg. of composition per m.$^2$ were used (542 g. dry weight); after drying and compression, the final thickness is equal to 1.3 mm. Hydrolysis at 70° C. did not alter the thickness.

| | G./m.$^2$ |
|---|---|
| Foam weight | 240 |
| Weight of dry impregnant | 542 |
| Total weight of the product (thickness=1.3 mm.) | 782 |

Consequently the average density of the new product, for a thickness of 1 mm. is equal to 0.6. It is the lightest synthetic product for making vamps. The weight ratio obtained by this formula is 44 parts of foam for 100 parts of impregnant (figured in dry weight).

EXAMPLE II

The elastomer polyurethane foam is of the "cured" type. Density 30 kg. m.$^3$. Number of cells: 80 pores per linear inch (25.4 mm.).

The impregnation composition contains the following substances:

| | Parts |
|---|---|
| Impranil CHW | 150 |
| Imprafix TH | 10 |
| Imprafix BE | 10 |
| Methylethylketon | 50 |
| | 220 |

The content in dry matters is equal to 24%. The selected theoretic coefficient is the same and equal to 0.25 mm. thickness of impregnation coat per m.$^2$ and per one mm. of foam thickness. The thickness of the foam is equal to 6 mm. The final product has 0.9 mm. in thickness. In this case, 1,500 kg. of impregnation composition per m.$^2$ was used, namely 360 g. of impregnant in dry weight per m.$^2$.

The average density of the product is 0.6 in spite of the change in the composition. The ratio in weight is equal to 50 parts of foam for 100 parts of dry extract of impregnant.

EXAMPLE III

With the same composition as in Example II a cured elastomer foam of 10 mm. in thickness was used. After impregation, drying and compression, the final thickness was equal to 1.45 mm. for 2,500 kg./m.$^2$ of composition, namely 600 g. of impregnant per m.$^2$ in dry weight.

Final density is equal to 0.62 per mm. of thickness and weight ratio is equal to 50 parts of foam for 100 parts of impregnant (dry weight).

EXAMPLE IV

Experiments were conducted with polyurethane Crisvon 5516 (thermoplastic linear polyurethane with one component) of the firm Dai Nippon, the same two thicknesses (6 and 10 mm.) of cured foam were used. The thicknesses after treatment were respectively 0.9 mm. and 1.45 mm. Mechanical characteristics in this instance were excellent.

The weight ratio of foam to impregnant in dry weight is in direct proportion with the theoretic ratio selected.

Experience has shown that a ratio of 0.25 resulted in a good and full impregnation of the foam.

Of course this ratio may vary with other types of polymethane and with the quality of foam. This can easily be determined in conducting previous trials.

This selection permits to obtain a final product more or less flexible, more or less elastic, strong and resilient.

For example, in the garment industry, a very flexible formula shall be selected as follows: 5% Imprafix TH and 5% BE per 100 Impranil CHW and dilution may be larger for a weight ratio of impregnation equal, for example, to 70/100.

For the bootmaking industry, one may use the formulas of Examples I and II which are not exhaustive (resistance: 100 kg./cm.$^2$).

For the travelling bag industry, products should be rather strong: one may use polymethane of I.C.I. such as "Daltoflex 345 L" with 20% of I.C.I. such as "Daltoflex 345 L" with 20% of isocyanate "Suprasec G," and the product obtained will be rather stiff and super resistant (about 300 kg./cm.$^2$).

In the above examples after impregnation, the product is brought to evaporation temperature of the solvents (about 80° during three minutes for the methylethylketon).

The product is then compressed to a maximum of 300 kg./cm.$^2$.

Consequently for the same impregnation coefficient and the same composition, the thickness of the product will vary only according to the thickness of the foam before impregnation.

The advantage of this process consists in the possibility of obtaining identical physical and chemical characteristics from one operation to the other.

The coating of an elastomer film on one of the faces of either polyurethane or a mixture of this substance with PVC applied directly or by transfer, give to the surface a pleated effect similar to that of leather. To this effect, one may use the following composition for the coating:

| | Parts |
|---|---|
| Impranil CHW | 100 |
| Imprafix TH | 5 |
| Imprafix BE | 5 |
| Methylethylketon | 20 |
| Colloidal silica | 2 |
| Microlyte Black CK of CIBA | 3 |

All sorts of products may be used to realize new combined products lined with "flock" or sand-papered polyurethane foam with a view to obtain the appearance of buckskin or else lined with a backing of knitted nylon or "Helanca" etc. to increase the resistance to pricks or else lined on woven or non-woven backings.

It is strange to see that polyurethane thus treated has the appearance of buckskin.

In the product for vamp, one side may be sand papered to obtain a pleasant touch and a very good commercial aspect.

EXAMPLE V

Elastomer polyurethane foam is finely crushed to obtain a fibrous material which is added in an elastomer solution in a ratio in weight of preferably 50/50 in order to obtain some mechanical resistance.

This mixture is processed by calendering technique as above described; solvents are dried: the whole is rolled with, however, the possibility to line the product with a woven or non-woven backing.

The following composition, which not exhaustive with regard to the proportion of mixture and the quality of the selected elastomer and binder produces a final texture similar in aspect as that obtained with non-crushed foam.

Impregnation composition:

| | Parts |
|---|---|
| Impranil CHW (30% dry extract) | 100 |
| Imprafix TH | 5 |
| Imprafix BE | 5 |
| Methylethylketon | 20 |
| Crushed polyurethane foam | 30 |

Operating method includes: calendering, drying of the solvent, curing during 48 hours and then hydrolysis. Weight ratio of the dry mixture obtained is equal to 50/50. The product is flexible but has a poor mechanical resistance, it is insufficient for application to vamp making.

It would be possible to increase the mechanical resistance in using "Daltoflex" I.C.I. elastomers or in mixing other fibres to the crushed polyurethane.

The above described process of impregnation, drying, compression, hydrolysis can also be applied to crossed brushed fabrics, preferably cotton, or with a frame of silk or even in crossed serge or in brushed and well shave velvet; one obtains an appearance of skin on the brushed side; if the fabric is brushed on both sides, the products looks like a rind or chamois leather according to the thickness of the fabric and the brushing.

I claim:

1. A process for making a resilient, microporous polyurethane for use as a leather-substitute material for boot vamps with improved physical and moisture permeability properties, comprising the steps:

providing a polyurethane macroporous foam material with interconnecting macropores, impregnating said macropores with a solution comprising polyurethane, drying to remove the solvent from said polyurethane solution leaving behind tacky polyurethane in said micropores, and thereafter compressing the impregnated material and permanently reducing the thickness of said material, while increasing the density of said material by the compression whereby said macroporous structure is converted to a microporous structure with interconnecting micropores.

2. A process according to claim 1 wherein after compression the microporous structure is hydrolysed in water, and then dried.

3. A process according to claim 1 wherein after compression the microporous structure is coated with a polyurethane film to simulate the appearance of leather.

4. A process according to claim 1 wherein the microporous structure is backed with fabric to increase tear resistance.

5. Process according to claim 1 wherein the solvent is taken from the group consisting of methylethylketone or ethyl acetate.

6. Process according to claim 1 wherein the polyurethane elastomer foam is taken from the group consisting of polyester or polyether materials and has a density of 10 to 50 kg./m.$^3$ and a pore count of from 30 to 100 pores per linear inch.

7. Process according to claim 1 wherein compression is applied at a pressure up to 1 metric ton per cm.$^2$ 8. Process according to claim 2, wherein water hydrolysis is conducted at a temperature of 70° C.

9. Process according to claim 1, wherein the polyurethane elastomer is from the group consisting of the polyester or polyether.

10. A process according to claim 1, wherein said impregnating solution is mixed with crushed polyurethane having interconnecting macropores, and including the step of calendering said mixture on a transfer backing prior to removing said solvent from the impregnated material.

11. A process according to claim 1 wherein said compressed polyurethane is fully dried and made into boot vamp material.

12. A process according to claim 10 wherein a backing material is added to said compressed structure.

13. A process according to claim 1 wherein the weight ratio of foam to impregnant (dry basis) comprises from 5:100 to 95:100.

References Cited

UNITED STATES PATENTS

| 2,955,056 | 10/1960 | Knox | 260—2.5 A |
| 3,061,460 | 10/1962 | Schickedanz | 260—2.5 A |
| 3,093,525 | 6/1963 | Wilson et al. | 260—2.5 A |
| 3,335,206 | 8/1967 | Fukushima et al. | 264—123 X |
| 3,362,036 | 1/1968 | Swan et al. | 260—2.5 A X |

CARL D. QUARFORTH, Primary Examiner

P. A. NELSON, Assistant Examiner

U.S. Cl. X.R.

156—247, 306, 78, 309, 154; 260—2.5 BD